United States Patent
Sakakibara et al.

(10) Patent No.: US 7,697,174 B2
(45) Date of Patent: Apr. 13, 2010

(54) IMAGE READER

(75) Inventors: Akihiro Sakakibara, Nagoya (JP);
Satoru Nakakita, Nagoya (JP);
Yasuhito Bandai, Nagoya (JP)

(73) Assignee: Brother Kogyo Kabushiki Kaisha,
Nagoya-shi, Aichi-ken (JP)

( * ) Notice: Subject to any disclaimer, the term of this patent is extended or adjusted under 35 U.S.C. 154(b) by 867 days.

(21) Appl. No.: 11/536,602

(22) Filed: Sep. 28, 2006

(65) Prior Publication Data
US 2007/0109612 A1 May 17, 2007

(30) Foreign Application Priority Data
Sep. 29, 2005 (JP) .............................. 2005-285328

(51) Int. Cl.
*H04N 1/04* (2006.01)
*G03G 15/00* (2006.01)
(52) U.S. Cl. ..................... 358/474; 399/380; 358/496
(58) Field of Classification Search .............. 355/407, 355/408, 48; 399/16, 17, 363, 365, 379, 399/380, 381; 271/3.09, 3.14, 8.1
See application file for complete search history.

(56) References Cited

U.S. PATENT DOCUMENTS

2003/0222395 A1* 12/2003 Kitami et al. ............... 271/162
2007/0036596 A1* 2/2007 Takahashi ................... 399/381
2007/0102873 A1* 5/2007 Acton et al. ................ 271/273

FOREIGN PATENT DOCUMENTS

JP      1994141143 A    5/1994
JP       199856541 A    2/1998

* cited by examiner

*Primary Examiner*—Jerome Grant, II
(74) *Attorney, Agent, or Firm*—Baker Botts, L.L.P.

(57) ABSTRACT

In an image reader having a static-document reading function and a moving-document reading function, a static-document pressing member is movably arranged on a cover portion and a sheet passing opening is opened or closed by moving the static-document pressing member. Further, the image reader includes a moving-document pressing member for pressing a document being automatically fed when it come to a document reading position on a platen glass when the static-document pressing member is moved to open the sheet passing opening.

16 Claims, 8 Drawing Sheets

DOCUMENT READING POSITION

DOCUMENT READING POSITION

DOCUMENT READING POSITION

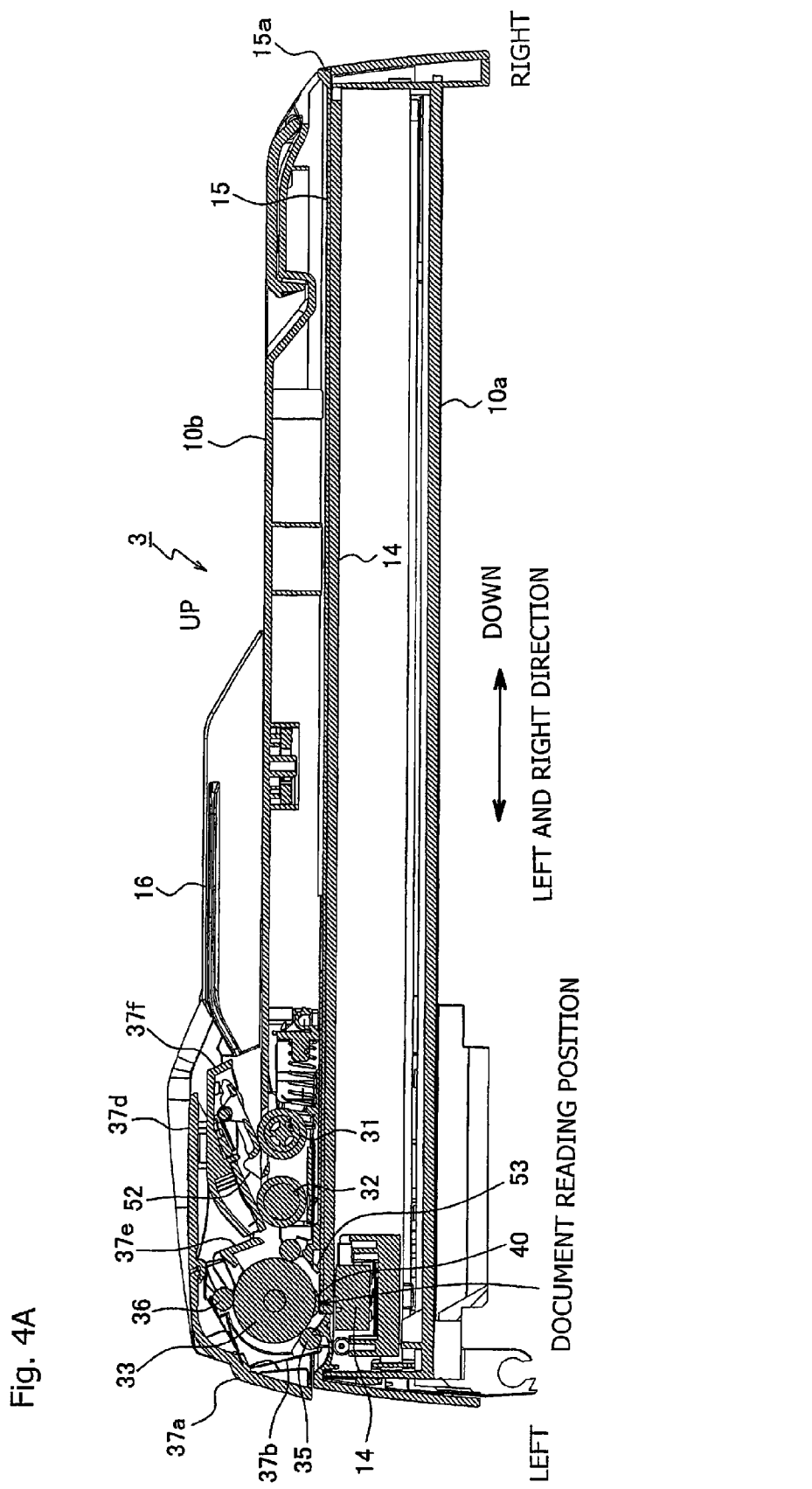

IMAGE READER

CROSS-REFERENCE TO RELATED APPLICATIONS

This application claims priority from Japanese Patent Application No. P2005-285328, filed on Sep. 29, 2005, the entire subject matter of which is incorporated herein by reference.

BACKGROUND OF THE INVENTION

1. Field of the Invention

Illustrative aspects of the present invention relate to an image reader capable of reading images of a document placed in a still state and a document being fed automatically.

2. Description of the Related Art

In an image reader, a static-document reading function is a function of reading an image on a document placed in a still state on a document reading plate such as a static-document reading plate, while a moving-document reading function is a function of reading an image on a document fed by an automatic document feeding mechanism to a document reading plate such as a moving-document reading plate (see J-P-A-10-56541) (hereinafter referred to as patent document 1).

Further, the automatic document feeding mechanism is constituted of a sheet passing opening (sheet feeding opening) which is formed on one side of both sides sandwiching a portion which faces the moving-document reading plate, a sheet passing opening (sheet discharging opening) which is formed on another side, and conveying rollers which convey the document and the like. Here, the sheet passing opening (sheet feeding opening) which is formed on one side is communicated with a sheet feeding tray side and the sheet passing opening (sheet discharging opening) which is formed on another side is communicated with a document discharging tray.

In the image reader described in the patent document 1, a static-document reading part for reading the image of the static document by the static-document reading function and a moving-document reading part for reading the image of the document by the moving-document reading function are separately arranged in parallel to each other thus achieving both of the static-document reading function and the moving-document reading function simultaneously.

SUMMARY OF THE INVENTION

However, in the image reader described in the patent document 1, the static-document reading part and the moving-document reading part are arranged in parallel to each other and hence, there arises a drawback that the image reader becomes large-sized in the direction that both document reading parts are arranged in parallel to each other.

To cope with this drawback, inventors of the present invention have studied the miniaturization of the image reader by integrally forming the static-document reading part and the moving-document reading part and by setting a document reading position for the moving-document reading function on one document reading plate. It is, however, found that this image reader gives rise to a following new drawback.

That is, the document reading position is positioned at a portion of the moving-document reading plate and hence, when the document reading position is set on one document reading plate, the sheet passing opening (particularly sheet feeding opening) is inevitably positioned at a portion which faces the document reading plate whereby the sheet feeding opening is read by a reading unit.

Here, the sheet passing opening exhibits the low optical reflectance and hence, in reading the document which is placed still, there may arise a case in which the document is darkly read at a portion where the sheet passing opening is positioned. Particularly, in reading a small-sized document, when the document is not present between the sheet feeding opening and the reading unit, there arises a drawback that a black shade is clearly cast onto a read image.

Aspects of the invention provide an image reader having a static-document reading function and a moving-document reading function, the miniaturization of the image reader while preventing the casting of a black shade onto a read image at the time of performing the static-document reading function.

according to an aspect of invention, there is provided an image reader having a static-document reading function and a moving-document reading function, wherein the image reader includes a reading unit for reading an image formed on a document, a document reading plate on which a document is placed, and an automatic document feeding unit which has a sheet passing opening which allows the document to pass therethrough at a position which faces the document reading plate and automatically conveys the document to a document reading position which is set on the document reading plate, a static-document pressing member which is movably arranged so as to open or close the sheet passing opening at a position which faces the document reading plate and presses the static document to the document reading plate side at the time of reading the static document, and a moving-document pressing member which presses the document which is automatically fed by the automatic document feeding unit at the document reading position when the static-document pressing member is moved so as to open the sheet feeding opening.

Due to such an image reader, it is possible to open or close the sheet passing opening by moving the static-document pressing member. Accordingly, at the time of reading the static document, by moving the static-document pressing member thus bringing the sheet passing opening into a closed state, that is, into a state in which the sheet passing opening is concealed by the static-document pressing member, there is no possibility that the sheet passing opening is read by the reading unit. Accordingly, particularly in reading a small-sized document, even when the document is not present between the sheet passing opening and the reading unit, a problem that a black shade is clearly cast onto a read image can be obviated.

On the other hand, at the time of performing the moving-document reading for reading the image formed on the document which is automatically fed by the automatic document feeding unit, even when the static-document pressing member is moved so as to bring the sheet passing opening into an open state, the moving-document pressing member is present at the document reading position and hence, there is no possibility that the sheet passing opening is read. Accordingly, a drawback that the black shade is cast onto the read image can be obviated.

Further, at the time of performing the moving-document reading, the moving-document pressing member presses the document which is automatically fed to the document reading plate side at the document reading position. Accordingly, there is no possibility that the document is floated from the document reading plate at the time of reading the document being fed and hence, it is possible to perform the beautiful image reading.

Further, by opening and closing the sheet passing opening by moving the static-document pressing member and by providing the moving-document pressing member at the document reading position, there is no possibility that a black shade is cast onto neither one of a static document read image and an automatic feeding document read image and hence, it is unnecessary to arrange a part for reading the static document and a part for reading the document being fed in parallel to each other in a divided manner. Accordingly, it is possible to miniaturize the image reader.

BRIEF EXPLANATION OF DRAWINGS

FIG. 2A to FIG. 2D are views showing the constitution and the manner of operation of the scanner of the first embodiment, wherein FIG. 2A is cross-sectional side view of the scanner in a state that the cover portion is closed, FIG. 2B is cross-sectional side view of the scanner in a state that the cover portion is opened, FIG. 2C is an enlarged cross-sectional view of a portion of the scanner shown in FIG. 2A, and FIG. 2D is an enlarged view of a portion of the scanner shown in FIG. 2B;

FIG. 3A and FIG. 3B are views showing the constitution and the manner of operation of a scanner of the second embodiment, wherein FIG. 3A is a schematic view showing the constitution of the scanner of the second embodiment, and FIG. 3B is a cross-sectional view of the scanner of the second embodiment; and FIG. 4A and FIG. 4B are views showing the constitution and the manner of operation of the scanner of the third embodiment, wherein FIG. 4A is cross-sectional side view of the scanner in a state that the cover portion is closed, and FIG. 4B is cross-sectional side view of the scanner in a state that the cover portion is opened.

DETAILED DESCRIPTION OF THE INVENTION

Hereinafter, embodiments to which the present invention is applied are described in conjunction with drawings. Here, the embodiments of the present invention are not limited to the embodiments described later and various modifications are considered without departing from a technical scope of the present invention.

First Embodiment

[Explanation of Whole Constitution of Scanner 1]

Figure 1:
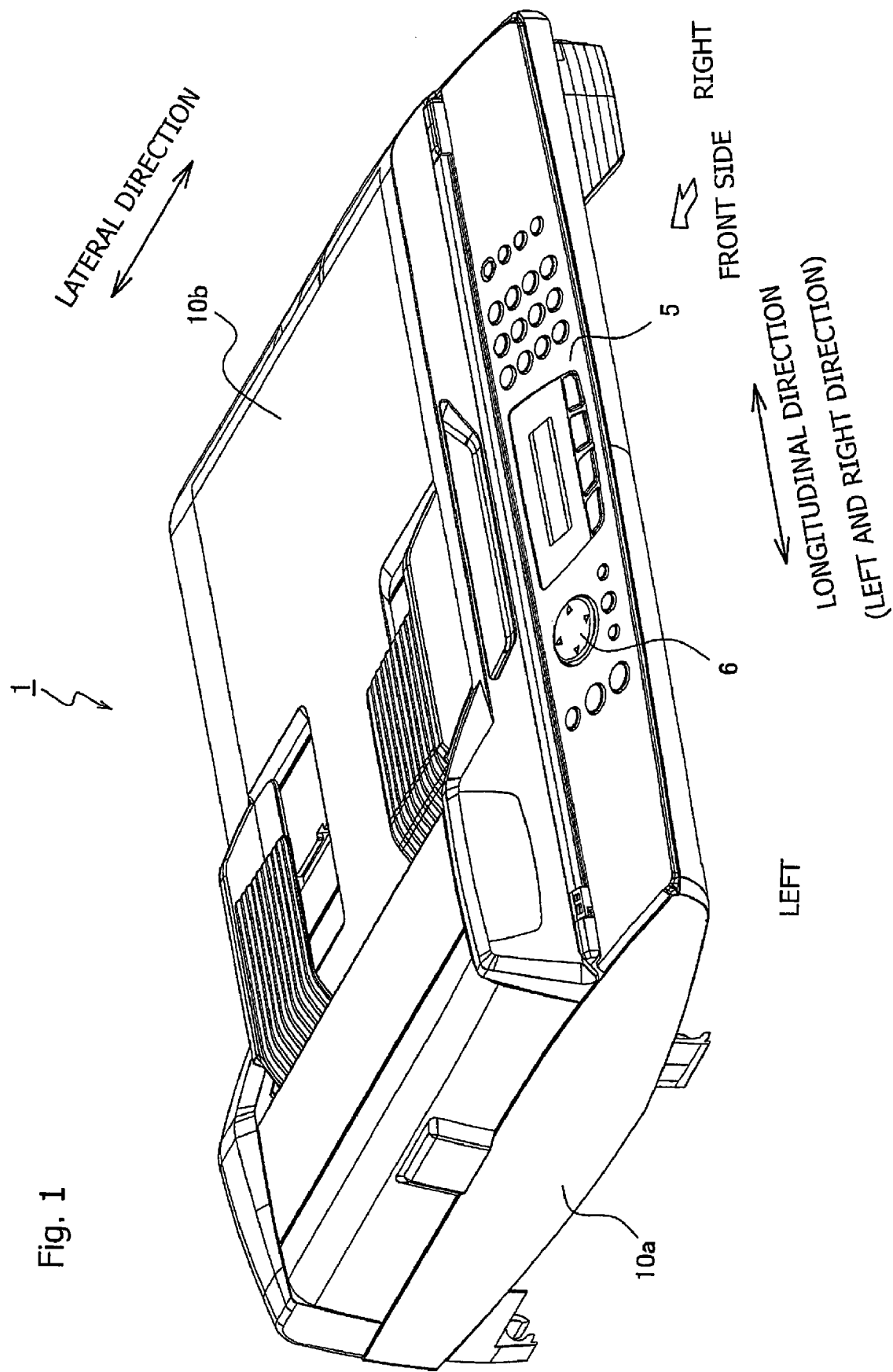
FIG. 1 is a view showing an appearance of a scanner 1 of the first embodiment.

FIG. 1 is an appearance view of a scanner 1 of this embodiment. The scanner 1 includes both of a flat bed mechanism (FB) and an automatic document feeding mechanism (ADF: Automatic Document Feed), wherein a cover portion 10b is configured to be opened or closed with respect to a flat bed portion 10a. Further, an operation panel 5 is mounted on a front face side of the cover portion 10b.

[Explanation of Respective Constitutional Elements]

Figure 2A:
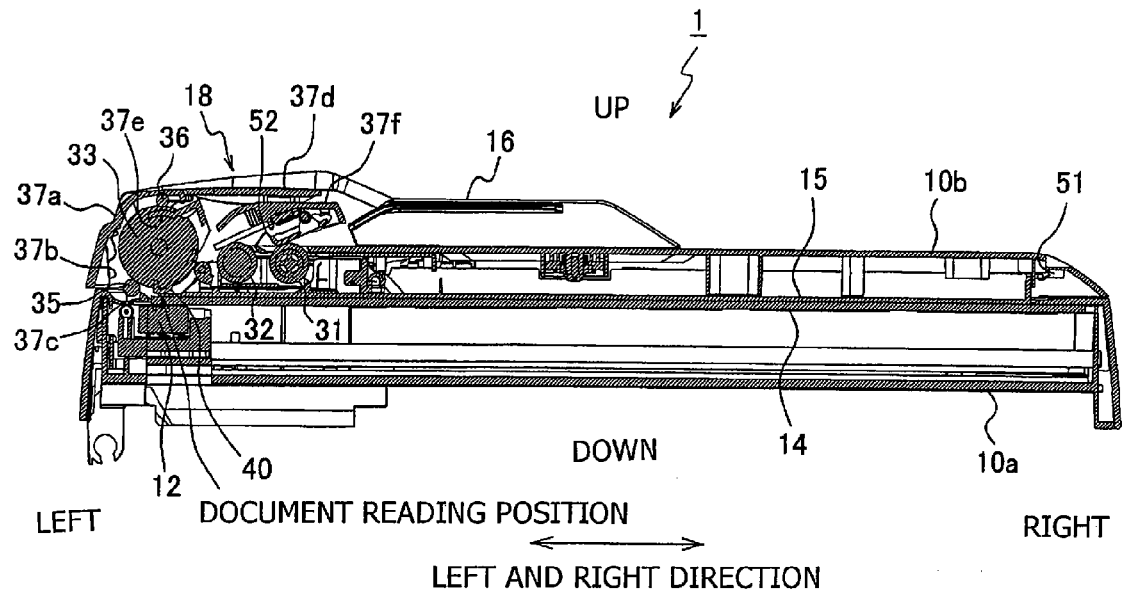
Figure 2B:
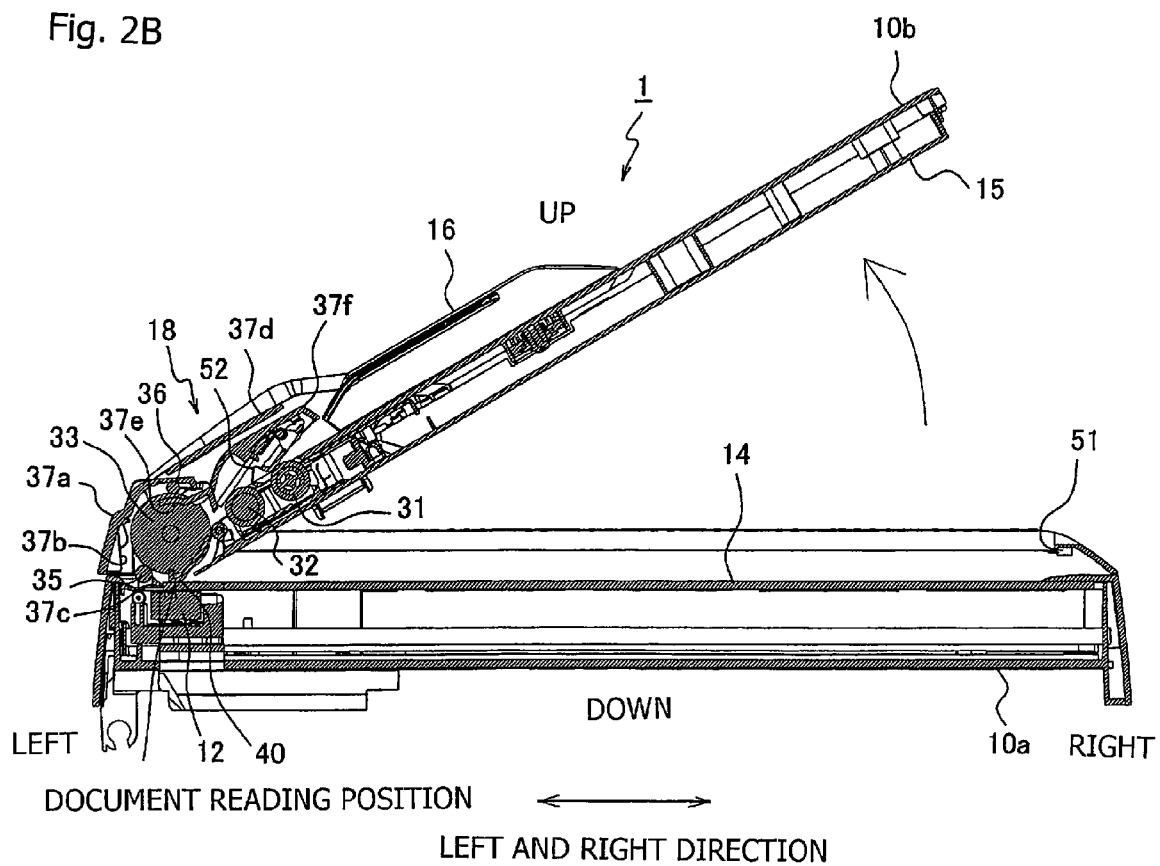
Figure 2C:
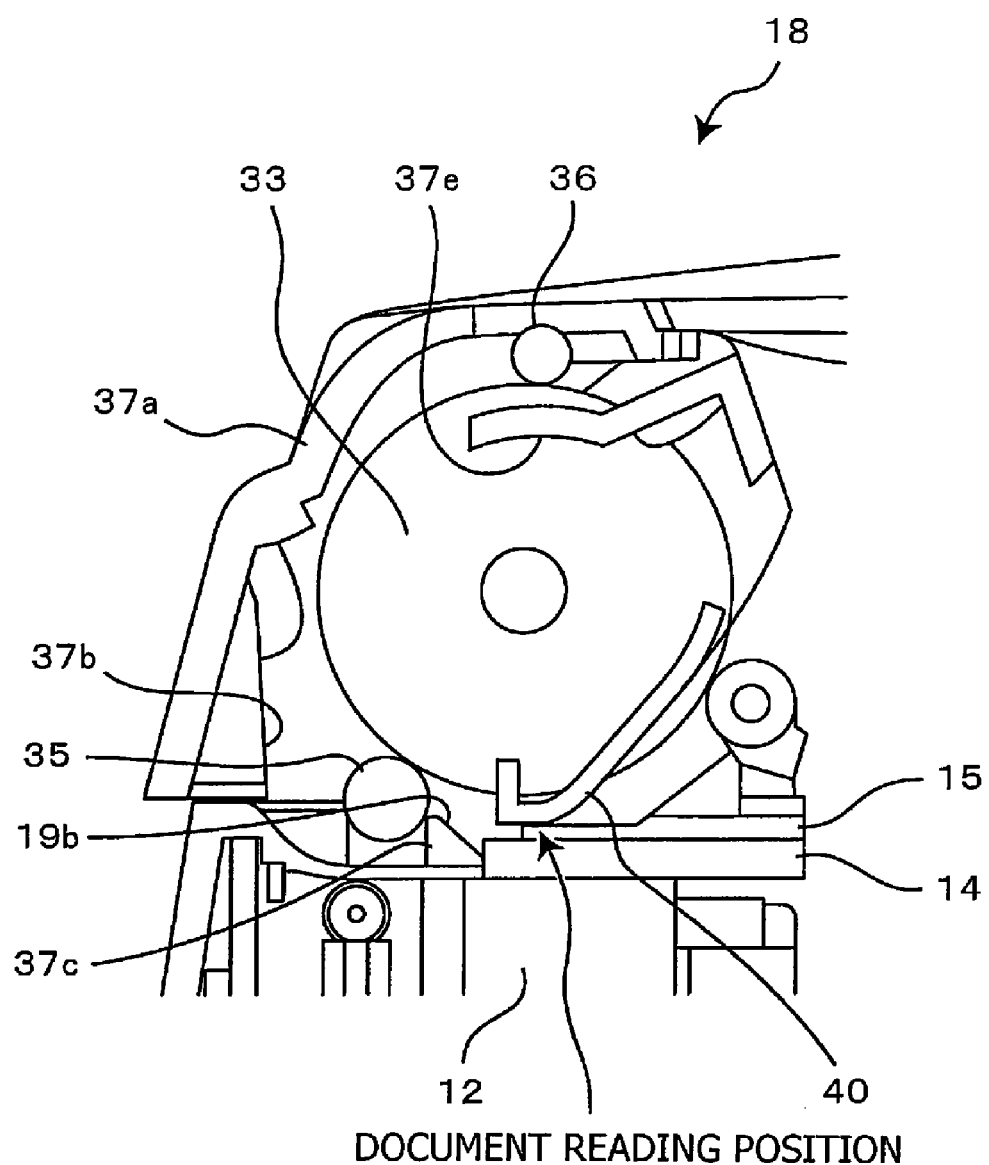

FIG. 2A FIG. 2B are cross-sectional side views of the scanner 1, wherein FIG. 2A is the cross-sectional side view of the scanner 1 in a state that the cover portion 10b is closed and FIG. 2B is the cross-sectional side view of the scanner 1 in a state that the cover portion 10b is opened. Further, FIG. 2C is an enlarged cross-sectional side view of the sheet passing opening.

In the scanner 1, as shown in FIG. 2A, the flat bed part 10a includes a close-contact-type image sensor (reading head) 12, a platen glass 14, a control part not shown in the drawing and the like, while the cover portion 10b includes a document feeding/discharging tray 16, an automatic document feeding device 18, a static-document pressing member 15 and the like.

The control part performs a control of the whole scanner and the detail of a content of the control is described later in detail.

The image sensor 12 serves to read an image formed on the document upon receiving a command from the control part, and includes a light emitting part (not shown in the drawing) and a light receiving part (photoelectric conversion element: not shown in the drawing). The image sensor 12 is configured to allow the light emitting part to radiate light to the document placed on the platen glass 14 or the document which is automatically fed by the automatic document feeding device 18 and to allow the light receiving part to receive a reflection light from the document so as to read the image.

Further, the image sensor 12 is configured to be driven in the lateral direction (see FIG. 2A) due to a drive mechanism not shown in the drawing, wherein in reading the image while actually automatically conveying the document using the automatic document feeding device 18, the light receiving part is moved to a document reading position.

The platen glass 14 is a member on which a document is placed and is made of a material such as glass or acryl having favorable transmissivity.

Figure 2D:
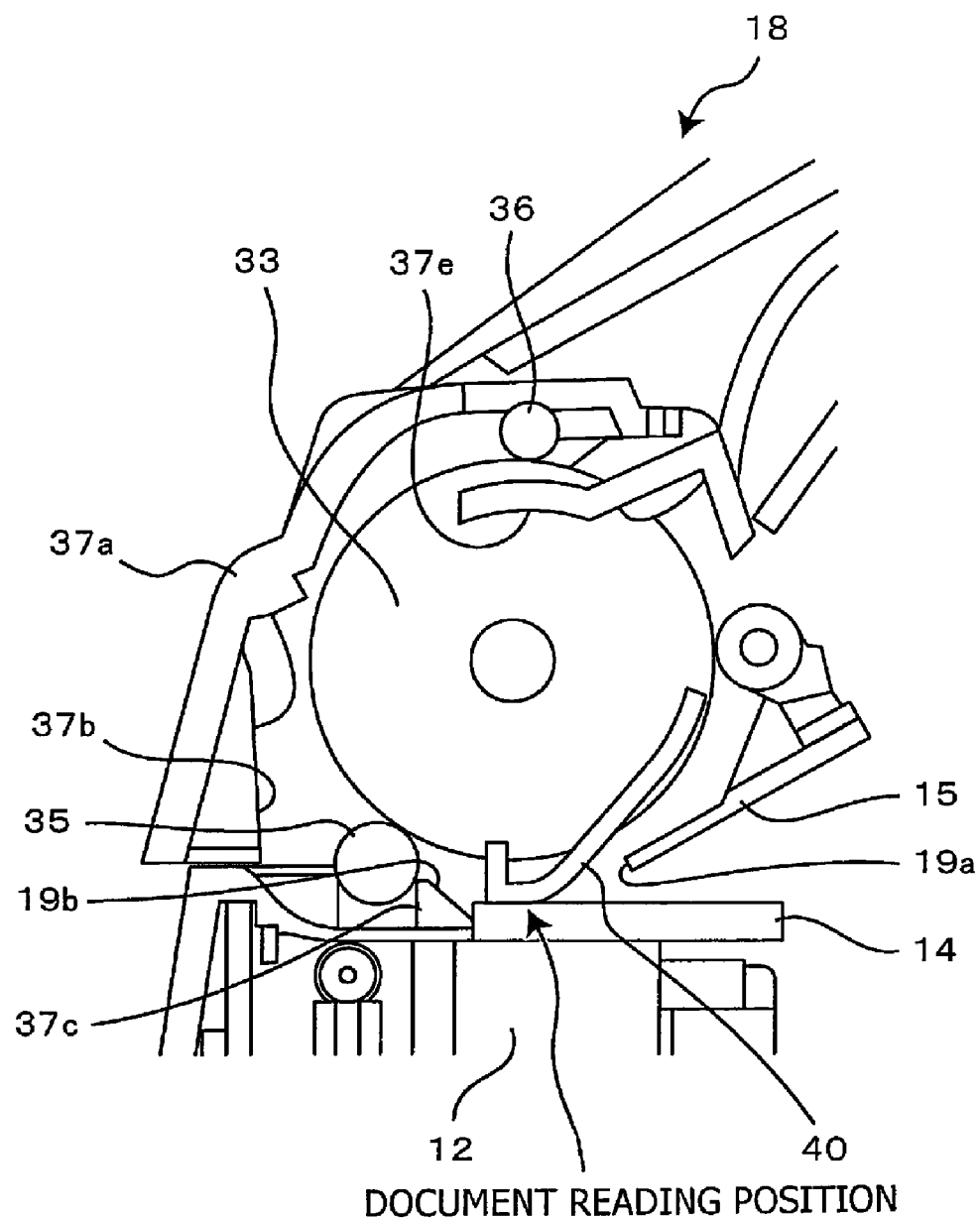

As readily understood from FIG. 2C and FIG. 2D which are enlarged views of the scanner 1, the automatic document feeding device 18 includes a sheet passing opening (a sheet feeding opening 19a) at a position at which the sheet passing opening faces the platen glass 14 and allows the document to pass therethrough, wherein the document is automatically fed to a document reading position which is set on the platen glass 14 by way of the sheet passing opening (sheet feeding opening). On a side opposite to a side at which the sheet feeding opening 19a is formed, a sheet discharging opening 19b is arranged.

The automatic document feeding device 18 includes a feed roller 32 which separates and feeds documents which are stacked on the document feeding/discharging tray 16 one by one, a suction roller 31 which introduces the document to the feed roller 32, a conveying roller 33 which conveys the document fed by the feed roller 32 along a conveying path (a path which is formed by guide members 37a to 37d and the platen glass 14), free rollers 35, 36 which are arranged to face the conveying roller 33 and are rotated following the rotation of the conveying roller 33 and the like.

The automatic document feeding device 18 discharges the documents which are fed through the suction roller 31, the feed roller 32, the conveying roller 33 and the free rollers 35, 36 to the document charging/discharging tray 16.

Further, the automatic document feeding device 18 has a sheet passing opening (sheet feeding opening) at a position which faces the document reading position of the platen glass 14. The sheet passing opening (sheet feeding opening) is an elongated hole which sets the lateral direction of the cover portion 10b (see FIG. 1) as the longitudinal direction thereof, wherein the document which is fed by the feed roller 32 passes through the sheet passing opening. The sheet passing opening (sheet feeding opening), as described later assumes a state in which the sheet passing opening is closed by the static-document pressing member 15 at the time of reading the static document and assumes a state in which the sheet passing opening is opened at the time of performing the moving-document reading thus allowing the document to be automatically fed to pass through the sheet passing opening.

Further, the automatic document feeding device 18 includes a moving-document pressing member 40. This moving-document pressing member 40 is arranged to face the document reading position and is arranged substantially directly above the document reading position. Here, the position at which the moving-document pressing member 40 is arranged may not be directly above the document reading position provided that the moving-document pressing member 40 can press the document to be automatically fed at the document reading position and the sheet passing opening is not arranged at the document reading position.

The moving-document pressing member 40 is biased by a resilient body such as a spring and presses down the document which is automatically fed to the platen glass 14 side between the sheet passing opening and the platen glass 14 due to a biasing force of the resilient body at the sheet passing opening (sheet feeding opening 19a) portion which is opened at the time of performing the moving-document reading. In this manner, by pressing the document which is automatically fed to the platen glass 14 side with the biasing force, it is possible to prevent the floating of the document at the document reading position.

Further, the moving-document pressing member 40 has at least a surface thereof which faces the platen glass 14 formed of color having high optical reflectance such as white, for example, for preventing the moving-document pressing member 40 per se from being read as a shade during image reading.

The static-document pressing member 15 is movably mounted on the cover portion 10b to open or close the sheet passing opening (sheet feeding opening 19a) at the position where the static-document pressing member 15 faces the platen glass 14. Then, the static-document pressing member 15 is configured such that, at the time of reading the static document, that is, when the cover portion 10b assumes a closed state, the static-document pressing member 15 is moved in the left direction of the cover portion 10b (see FIG. 2A and FIG. 2C) to bring the sheet passing opening (sheet feeding opening 19a) into a closed state and, at the same time, presses the static document to the platen glass 14 side. On the other hand, the static-document pressing member 15 is configured such that at the time of reading the document being fed (that is, when the cover portion 10b assumes an open state), the static-document pressing member 15 is moved in the right direction of the cover portion 10b (see FIG. 2B and FIG. 2D) so as to release the sheet passing opening (sheet feeding opening 19a).

Further, the static-document pressing member 15 has, to prevent the static-document pressing member 15 per se from being read as a shade at the time of performing image reading, at least a surface thereof which faces the platen glass 14 in color which has high optical reflectance such as white, for example.

The cover portion 10b is mounted on the flat bed portion 10a such that the cover portion 10b is tiltable about a rotary shaft of the conveying roller 33.

When the cover portion 10b assumes a closed state as shown in FIG. 2A and FIG. 2D, the sheet passing opening (sheet feeding opening 19a) assumes a closed state due to the static-document pressing member 15 and hence, the static-document reading can be performed. On the other hand, when the cover portion 10b is pulled up by the user or the like as shown in FIG. 2B, the cover portion 10b is rotated about the conveying roller 33 which constitutes the center of rotation in the counterclockwise direction (see FIG. 2B) thus assuming an open state. In this state, the cover portion 10b is held at an open state due to a support mechanism not shown in the drawing thus enabling the automatic reading document.

Further, an open/close sensor 51 for detecting an open/close state of the cover portion 10b is mounted on a right end portion of the cover portion 10b (see FIG. 2A). The open/close sensor 51 is turned on when the cover portion 10b assumes an open state and the open/close sensor 51 is turned off when the cover portion 10b assumes a closed state.

A reading start switch 6 for starting the image reading by the scanner 1 is mounted on the operation panel 5. When the user presses down the reading start switch 6 the static-document reading or the reading of the document being fed is performed.

The control part performs a control of the whole scanner including, for example, a control of the image reading based on the image sensor 12 or a document conveying control of the automatic document feeding device 18 by detecting the turning ON/OFF of the open/close sensor 51. Here, the control part does not allow the automatic document feeding device 18 to be operated when the open/close sensor 51 is turned off and allows the automatic document feeding device 18 to be operated when the open/close sensor 51 is turned on.

[Operation of Respective Constitutional Elements at the Time of Performing Static-Document Reading]

The manner of operation of the respective constitutional elements in performing the static-document reading using the scanner 1 having the above-mentioned constitution is described hereinafter.

In performing the static-document reading, as shown in FIG. 2A, the cover portion 10b assumes a closed state. Here, the document is placed on the platen glass 14 in a still state in which a reading surface of the document faces the platen glass 14 and is pressed to the platen glass 14 by the static-document pressing member 15.

In this manner, by pressing the document to the platen glass 14 side using the static-document pressing member 15, it is possible to prevent the floating of the document thus eliminating a gap between the platen glass 14 and the document whereby it is possible to beautifully read the document.

In performing the static-document reading, the sheet passing opening (sheet feeding opening 19a) assumes a closed state due to the static-document pressing member 15 and the moving-document pressing member 40 also assumes an elevated state thus the moving-document pressing member 40 is concealed behind the static-document pressing member 15 as viewed from the surface of the platen glass 14.

Then, when the reading start switch 6 of the operation panel 5 is pushed down, upon receiving a command from the control part, the image sensor 12 is driven in the lateral direction (see FIG. 2A) by a drive mechanism not shown in the drawing, while allowing the light emitting part not shown in the drawing to radiate light and reads an image by allowing the light receiving part to receive a reflection light from the document.

Here, in performing the static-document reading, the cover portion 10b assumes a closed state and hence, an open/close sensor 51 is turned off. When the open/close sensor 51 is turned off, the control part does not allow the automatic document feeding device 18 to be operated. Accordingly, even when the document is placed on the document feeding/discharging tray 16, there is no possibility that the document is fed using a suction roller 31.

[Manner of Operation of Respective Constitutional Elements in Reading the Document Being Fed]

Next, the manner of operation of the respective constitutional elements in performing the moving-document reading using the scanner 1 is described hereinafter.

In performing the moving-document reading, as shown in FIG. 2B, the cover portion 10b is opened and is held at an open state due to a support mechanism not shown in the drawing.

In assuming an open state of the cover portion 10b, the cover portion 10b is rotated about the conveying roller 33 which constitutes the center of rotation in the counterclockwise direction (see FIG. 2B). A left end portion of the static-document pressing member 15 (see FIG. 2B) is mounted on the cover portion 10b in a state that the left end portion is slightly spaced apart from an outer peripheral portion of the conveying roller 33. Accordingly, when the cover portion 10b is rotated about the rotational axis of the conveying roller 33, a gap is generated between the left end portion of the static-document pressing member 15 and the conveying roller 33 and a gap is generated between the left end portion of the static-document pressing member 15 and the platen glass 14. These gaps constitute the sheet passing opening (sheet feeding opening 19a).

The moving-document pressing member 40 is configured to be lowered into the gap (sheet passing opening) due to a resilient force thereof thus the document to be fed is pressed to the platen glass 14 side.

Further, when the cover portion 10b assumes an open state, the open/close sensor 51 is turned on.

Then, when the reading start switch 6 of the operation panel 5 is pushed down, provided that the open/close sensor 51 is already turned on, the control part allows the automatic document feeding device 18 to be operated. Accordingly, in the automatic document feeding device 18, the documents stacked on the document feeding/discharging tray 16 are separated using a feed roller 32 and are fed one by one, and are fed to the sheet passing opening (sheet feeding opening 19a).

The document which is made to pass through the sheet passing opening (sheet feeding opening 19a) is pressed to a document reading position of the platen glass 14 by the moving-document pressing member 40, and an image on the document is read by the image sensor 12.

In performing the moving-document reading, upon receiving a command from the control part, while being held at the document reading position, the image sensor 12 allows the light emitting part not shown in the drawing to radiate light and reads an image by allowing the light receiving part to receive a reflection light from the document.

The document whose image is read by the image sensor 12 and is made to pass through the reading position is turned toward a left upper side (see FIG. 2B) by a conveying member 37c which is mounted outside an end portion of the platen glass 14. Then, the document is fed along the conveying member 37a while being sandwiched between the conveying roller 33 and the free roller 35.

Then, the document is fed along the conveying member 37e while being sandwiched between the conveying roller 33 and the free roller 36 and is discharged to the document feeding/discharging tray 16 through a discharge opening which is formed by conveying members 37f, 37d.

Explanation of Advantageous Effects of the First Embodiment

In the scanner 1 which has been described in detail heretofore, the sheet passing opening (sheet feeding opening 19a) is opened or closed by moving the static-document pressing member 15. Accordingly, in performing the static-document reading, when the sheet passing opening is brought into a closed state, that is, the sheet passing opening having the low optical reflectance is concealed by the static-document pressing member 15 having the optical reflectance larger than a predetermined value by moving the static-document pressing member 15, there is no possibility that the sheet passing opening is read by the image sensor 12. Accordingly, in reading a small-sized document particularly, even when the document is not present between the sheet passing opening and the reading unit, there is no possibility that a black shade is clearly cast onto a read image.

On the other hand, in reading the document being fed in which an image on the document to be automatically fed by the automatic document feeding device 18, even when the sheet passing opening is brought into a closed state by moving the static-document pressing member 15, the moving-document pressing member 40 in a color which has high optical reflectance is present at the document reading position. Accordingly, there is no possibility that the sheet passing opening having low optical reflectance is read. Accordingly, there is no possibility that a drawback that a black shade is clearly cast onto a read image arises.

Further, with the provision of the moving-document pressing member 40 in color which has high optical reflectance, even though a width of the document to be automatically fed is smaller than a width of the static-document pressing member 15, in reading the document, there is no possibility that a drawback that a black shade is cast onto a blank portion (portion of static-document pressing member 15 which is projected from the document) arises.

Further, in reading the document being fed, the moving-document pressing member 40 presses the document to be automatically fed to the platen glass 14 side at the document reading position. Accordingly, there is no possibility that the document being fed is floated from the platen glass 14 at the time of reading the document fed by ADF and hence, it is possible to perform the beautiful image reading.

In this manner, by opening and closing the sheet passing opening by moving the static-document pressing member 15 and with the provision of the moving-document pressing member 40 at the document reading position, there is no possibility that a black shade is cast onto either one of a static document read image and a moving-document read image and hence, it is unnecessary to arrange a part for reading the static document and a part for reading the document being fed in parallel to each other in a divided manner. Accordingly, it is possible to miniaturize the scanner 1.

Second Embodiment

Next, a scanner 2 of another aspect is described. The scanner 2 described in the second embodiment differs from the scanner 1 only with respect to the constitution of the static-document pressing member 15 and the other constitution is substantially as same as the constitution of the first embodiment. Accordingly, in the second embodiment, only parts which make the scanner 1 of this embodiment different from the scanner 1 of the first embodiment are described, wherein parts identical with the parts in the scanner 1 of the first embodiment are given the same symbols and their explanation is omitted.

[Explanation of Respective Constitutional Elements]

Figure 3A:
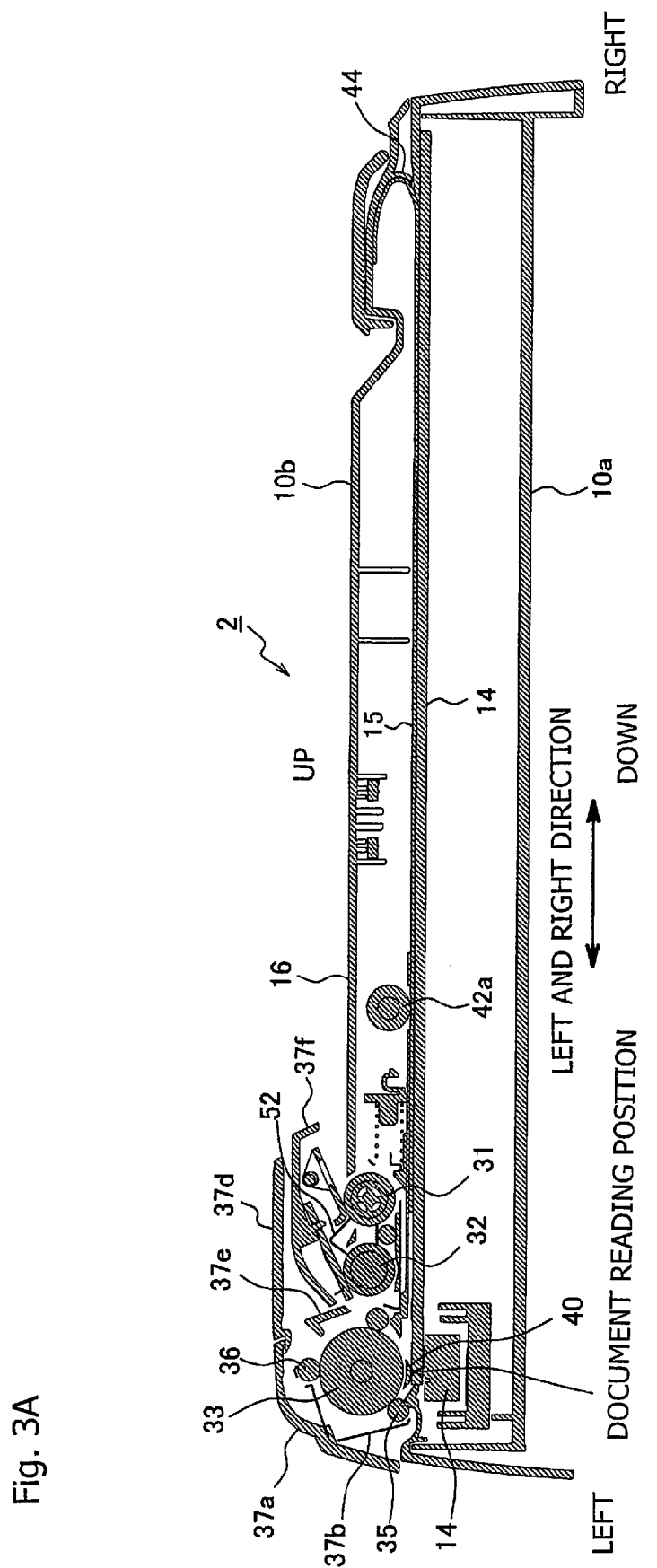
Figure 3B:
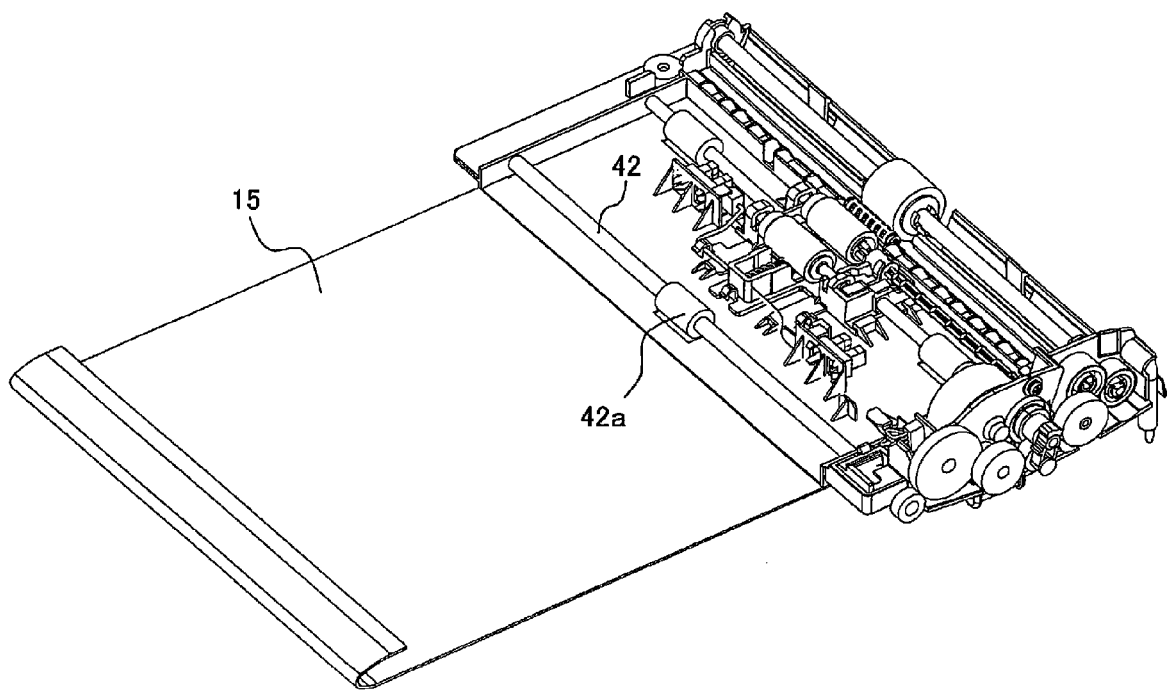

FIG. 3A and FIG. 3B are schematic views showing the constitution of the scanner 2. FIG. 3A is a cross-sectional side view of the scanner 2 and FIG. 3B is a view of the scanner 2 in a state that a static-document pressing member 15 is turned at an end portion thereof.

A cover portion 10b of the scanner 2 includes, as shown in FIG. 3A, a drive part 42 for moving the static-document pressing member 15 in the direction parallel to the cover portion 10b. The drive part 42 opens and closes the sheet passing opening (sheet feeding opening 19a) by moving the static-document pressing member 15.

The drive part 42 includes a drive motor not shown in the drawing and a drive roller 42a which is driven by the drive motor.

A right end portion of the static-document pressing member 15 (see FIG. 3A) has resiliency.

A guide 44 is provided to a right end portion of the cover portion 10b (see FIG. 3A). To prevent the resilient portion of the static-document pressing member 15 from projecting to the outside of the outer periphery of the cover portion 10b, the guide 44 turns the resilient portion of the static-document pressing member 15 to the inside of the outer periphery of the cover portion 10b based on a predetermined angle condition (180° in the second embodiment).

Here, the predetermined angle condition when the guide 44 turns the resilient portion of the static-document pressing member 15 to the inside of the outer periphery of the cover portion 10b is a condition which is relevant to an angle which is determined based on a position at which the static-document pressing member 15 is turned and a position of the outer periphery of the cover portion 10b to prevent the static-document pressing member 15 having resiliency from projecting to the outside of the outer periphery of the cover portion 10b. For example, when the position at which the static-document pressing member 15 is turned is close to the outer periphery of the cover portion 10b, the angle which turns the static-document pressing member 15 becomes approximately 90° or more and 180° or less, while when the position at which the static-document pressing member 15 is turned retracts from the outer periphery of the cover portion 10b toward the inside of the cover portion 10b, the angle at which the static-document pressing member 15 is turned may be set to a value smaller than 90°.

Further, "portion of the static-document pressing member 15 which projects to the outside of the outer periphery of the cover portion 10b when the static-document pressing member 15 is moved in the direction parallel to the cover portion 10b by the drive part 42" implies a portion of the static-document pressing member 15 which projects to the outside of the outer periphery of the cover portion 10b when the static-document pressing member 15 is moved in the direction parallel to the cover portion 10b in a state that the guide 44 is not present.

Here, "resilient portion" implies that a portion of or the whole static-document pressing member 15 may be formed of a material having resiliency or may be formed of a plurality of parts which imparts the deflection to the static-document pressing member 15.

A document detection sensor 52 which detects the documents stacked on a document feeding/discharging tray 16 is mounted on the automatic document feeding device 18. The document detection sensor 52 is turned on when the document is present and is turned off when the document is not present.

The control part reads the document by allowing the automatic document feeding device 18 to be operated when the document detection sensor 52 is turned on (when the document is present on the document feeding/discharging tray 16) and does not allow the automatic document feeding device 18 to be operated when the document detection sensor 52 is turned off (when the document is not present on the document feeding/discharging tray 16).

Further, the control part allows the drive motor not shown in the drawing to be operated so as to move the static-document pressing member 15 in the lateral direction (see FIG. 3A).

[Manner of Operation of Respective Constitutional Elements in Reading the Static Document]

In reading the static document, the static-document pressing member 15 is moved to a left end portion of the platen glass 14 in FIG. 3A by the drive roller 42a. In other words, the static-document pressing member 15 is arranged so as to cover the whole effective reading range of the platen glass 14.

In such a state, the sheet passing opening (sheet feeding opening 19a) assumes a closed state, and the moving-document pressing member 40 is also concealed behind the static-document pressing member 15.

Then, when the reading start switch 6 of the operation panel 5 is pushed down, upon receiving a command from the control part, the image sensor 12 is driven in the lateral direction in FIG. 3A by a drive mechanism not shown in the drawing while allowing the light emitting part not shown in the drawing to radiate light and reads the image by allowing the light receiving part to receive a reflection light from the document.

[Operation of Respective Constitutional Elements in Reading the Document Being Fed]

Next, the manner of operation of respective constitutional elements at the time of reading the document being fed using the scanner 2 is described.

When the document is stacked on the document feeding/discharging tray 16, the document detection sensor 52 is turned on.

Then, when the reading start switch 6 of the operation panel 5 is pushed down, the control part allows a drive motor not shown in the drawing to be operated. As a result, the drive roller 42a is rotated in the counterclockwise direction (see FIG. 3A) and the static-document pressing member 15 is moved in the rightward direction (see FIG. 3A).

When the static-document pressing member 15 is moved in the rightward direction, as shown in FIG. 3B, a resilient portion of the static-document pressing member 15 is turned to the inside of the outer periphery of the cover portion 10b by 180° by the guide 44 to prevent the resilient portion of the static-document pressing member 15 from projecting to the outside of the outer periphery of the cover portion 10b.

Further, when the static-document pressing member 15 is moved in the rightward direction, the sheet passing opening (sheet feeding opening 19a) arranged at the left end portion of the static-document pressing member 15 (see FIG. 3A) is opened and the moving-document pressing member 40 appears.

Then, the document is automatically fed by the automatic document feeding device 18 and, at the same time, upon receiving a command from the control part, an image on the document is read by the image sensor 12 which is fixed at a document reading position and, thereafter, the document is discharged to the document feeding/discharging tray 16.

Explanation of Advantageous Effect of the Second Embodiment

According to the scanner 2 which has been described in detail heretofore, the sheet passing opening (sheet feeding opening 19a) is opened or closed by moving the static-document pressing member 15 using the drive part 42. That is, in feeding the document using the automatic document feeding device 18, by operating the drive part 42, the static-document pressing member 15 is moved in the direction parallel to the cover portion 10b thus brining the sheet passing opening into an open state. On the other hand, in performing the static-document reading, the drive part 42 is operated and hence, the static-document pressing member 15 is moved in the direction parallel to the cover portion 10b thus bringing the sheet passing opening into a closed state. Accordingly, in reading the document, it is no more necessary for a user to perform an operation to pull up the cover portion 10b or the like for moving the document pressing member and hence, it is possible to provide the easy-to-use scanner 2.

Further, the drive part 42 is constituted of the drive roller 42a and the drive motor which rotates the drive roller 42a, and the drive part 42 is configured to be operated in an interlocking manner with the reading start switch 6 which starts image reading. Accordingly, at the time of reading the document being fed, it is possible for the user to bring the sheet passing opening into an open state by manipulating (for example, pushing down) the reading start switch 6. Accordingly, with only the simple operation to manipulate the reading start switch 6, it is possible to perform the moving-document reading and hence, it is possible to provide the extremely easy-to-use scanner 2.

Further, when the static-document pressing member 15 is moved in the direction parallel to the cover portion 10b, the static-document pressing member 15 is turned toward the inner side of the cover portion 10b from the outer periphery of the cover portion 10b while being guided by the guide 44. Accordingly, there is no possibility that the static-document pressing member 15 projects to the outside of the outer periphery of the cover portion 10b when the static-document pressing member 15 is moved and hence, it is possible to minimize a space occupied by the scanner 2.

Third Embodiment

Next, a scanner 3 of another aspect is described. The scanner 3 described in the third embodiment differs from the scanner 1 only with respect to the constitution of the static-document pressing member 15 and the other constitution is substantially same as the constitution of the first embodiment. Accordingly, in the third embodiment, only parts which makes the scanner 1 of this embodiment different from the scanner 1 of the first embodiment are described, wherein parts identical with the parts in the scanner 1 of the first embodiment are given the same symbols and their explanation is omitted.

[Explanation of Respective Constitutional Elements]

Figure 4B:
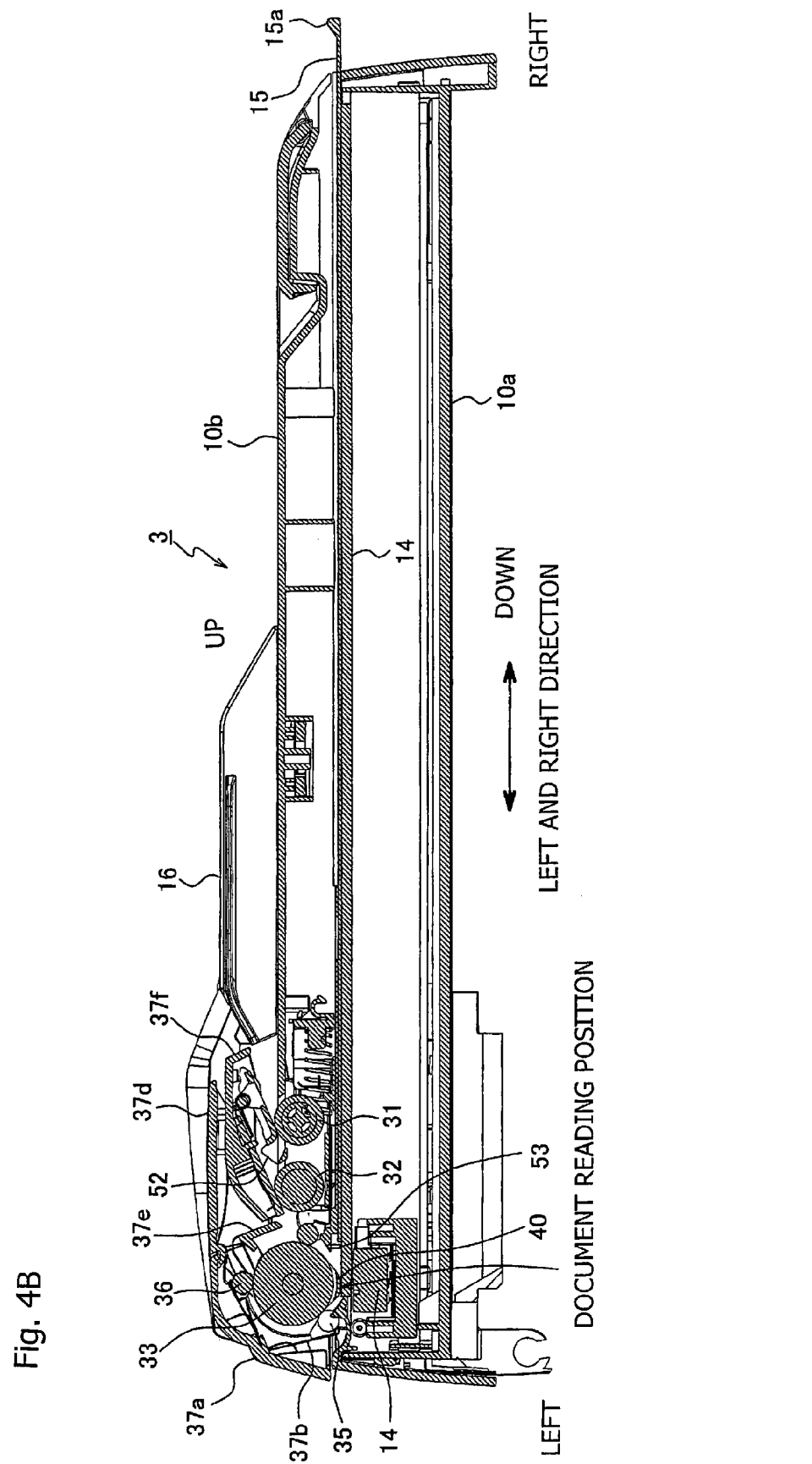

FIGS. 4A and 4B are cross-sectional side views showing the constitution of the scanner 3. FIG. 4A is a cross-sectional side view of the scanner 3 in a state that the static-document pressing member 15 is pushed into the cover portion 10b, and FIG. 4B is a cross-sectional side view of the scanner 3 in a state that the static-document pressing member 15 is pulled out from the cover portion 10b.

Guide grooves not shown in the drawing are formed in edge portions of the cover portion 10b of the scanner 3 on a viewer's side and a side opposite to the viewer's side in FIG. 4A in the lateral direction (see FIG. 4A). Then, the static-document pressing member 15 is mounted on the cover portion 10b in a state that the static-document pressing member 15 is fit in the guide grooves. A handle 15a is formed on a right end of the cover portion 10b (see FIG. 4A). That is, when the user pulls the handle 15a in the rightward direction (see FIG. 4A), the static-document pressing member 15 is moved in the rightward direction, while when the user pushes the handle 15a in the leftward direction (see FIG. 4A), the static-document pressing member 15 is moved in the leftward direction.

A static-document pressing member position sensor 53 is mounted on a right end portion of the static-document pressing member 15 (see FIG. 4A). When the handle 15a is pushed in the leftward direction and the static-document pressing member 15 is moved in the leftward direction and a left end of the static-document pressing member 15 (see FIG. 4A) reaches a left end of the platen glass 14, the static-document pressing member position sensor 53 is turned on. On the other hand, when the handle 15a is pulled in the rightward direction, the static-document pressing member 15 is moved in the rightward direction and the left end of the static-document pressing member 15 is separated from the left end of the platen glass 14, the static-document pressing member position sensor 53 is turned off.

When the static-document pressing member position sensor 53 is turned off, the control part does not allow the automatic document feeding device 18 to be operated, while when the static-document pressing member position sensor 53 is turned off, the control part allows the automatic document feeding device 18 to be operated.

[Operation of Respective Constitutional Elements in Reading the Static Document]

In reading the static document, the user pushes the handle 15a in the leftward direction (see FIG. 4A) whereby the static-document pressing member 15 is moved in the leftward direction. When the static-document pressing member 15 is moved in the leftward direction, the sheet passing opening (sheet feeding opening 19a) is brought into a closed state and the moving-document pressing member 40 is also concealed behind the static-document pressing member 15. Further, the static-document pressing member position sensor 53 is turned on.

Then, when the reading start switch 6 of the operation panel 5 is pushed down, upon receiving a command from the control part, the image sensor 12 is driven in the lateral direction (see FIG. 4A) by a drive mechanism not shown in the drawing, while allowing the light emitting part not shown in the drawing to radiate light and reads an image by allowing the light receiving part to receive a reflection light from the document.

Here, in reading the static document, the static-document pressing member position sensor 53 is turned on. When the static-document pressing member position sensor 53 is turned on, the control part does not allow the automatic document feeding device 18 to be operated. Accordingly, even when the document is placed on the document feeding/discharging tray 16, there is no possibility that the document is fed using the suction roller 31.

[Operation of Respective Constitutional Elements in Reading Automatic Feeding Document]

Next, the manner of operation of respective constitutional elements at the time of reading the document being fed using the scanner 3 is described.

In reading the document fed by ADF, the user pulls the handle 15a in the rightward direction (see FIG. 4A) whereby the static-document pressing member 15 is moved in the rightward direction. When the static-document pressing member 15 is moved in the rightward direction, the sheet passing opening (sheet feeding opening 19a) is opened and the moving-document pressing member 40 appears.

Further, when the static-document pressing member 15 is moved in the rightward direction, the static-document pressing member position sensor 53 is turned off. Provided that the static-document pressing member position sensor 53 is turned off, when the reading start switch 6 of the operation panel 5 is pushed down, the control part allows the document to be fed by the automatic document feeding device 18 and, at the same time, allows an image on the document to be read by the image sensor 12 which is fixed to the document reading position and allows the document to be discharged into the document feeding/discharging tray 16.

Explanation of Advantageous Effect of the Third Embodiment

In the scanner 3 which has been described in detail heretofore, a handle is formed on the static-document pressing member 15 and a guide groove is formed in the cover portion 10b in the lateral direction (see FIG. 4A, FIG. 4B) and the static-document pressing member 15 can be moved in the direction parallel to the cover portion 10b using the guide groove. In this manner, the mechanism for moving the static-document pressing member 15 can be easily formed of the simple constitution which is constituted of the handle mounted on the static-document reading document presser 15 and the guide grooves formed in the cover portion 10b and hence, it is possible to realize the reduction of weight and the reduction of cost of the scanner 3.

[Explanation of Modifications]

Here, the embodiments of the present invention are not limited to the above-mentioned embodiments, and various aspects can be applied provided that the aspect belongs to a technical range of the present invention.

For example, in the above-mentioned embodiments, the conveying passage of the document to be automatically fed is formed as a passage in which the document is fed from the inner side of the cover portion 10b and is discharged to the outer side of the cover portion 10b. That is, the sheet passing opening constitutes the sheet feeding opening 19a. On the other hand, a conveying passage may be configured such that the document is fed from the outer side of the cover portion 10b and is discharged to the inner side of the cover portion 10b, that is, the sheet passing opening constitutes the sheet feeding opening 19b.

Further, in the second embodiment, the static-document pressing member 15 is moved using the drive roller 42a. However, both end portions of the static-document pressing member 15 in the lateral direction (see FIG. 3A) may be configured to be moved in a state that both end portions are pulled to the inside of the cover portion 10b using a wire or the like.

Further, in the second embodiment, the resilient portion of the static-document pressing member 15 is turned to the direction by approximately 180° with respect to the moving direction to the inside of the cover portion 10b. However, the turning angle may be set to any angle provided that an edge portion of the static-document pressing member 15 does not project to the outside from the outer periphery of the cover portion 10b. For example, by setting the turning angle to 90°, the resilient portion of the static-document pressing member 15 is turned upward direction of the cover portion 10b and an end portion of the static-document pressing member 15 may project the upper side of the cover portion 10b.

Further, in the third embodiment, the guide grooves for the static-document pressing member 15 are formed in both ends of the cover portion 10b (viewer's side and another side of the viewer's side in FIG. 4A), however, the guide grooves may be formed in the inner side of the cover body 10b and projecting portions may be formed on an upper portion of the static-document pressing member 15 whereby the projection portions thereof may be guided by the guide grooves.

Further, in the third embodiment, the handle 15a is formed on the right end portion of the static-document pressing member 15 (see FIG. 4A), however, the handle 15a may be formed on a side surface side (viewer's side or another side of the viewer's side in FIG. 4A) end portion so as to allow the user to slide the static-document pressing member 15 in the lateral direction.

As described above, according to the image reader, it is possible to miniaturize the image reader while preventing the casting of the black shade onto the read image during the image reader is performing the static-document reading function.

Here, various methods are considered in moving the static-document pressing member. For example, the image reader may include a cover which incorporates an automatic document feeding unit, the static-document pressing member and the moving-document pressing member therein, is tiltably connected with a body portion in which the document reading plate is arranged, and covers the document reading plate, and the static-document pressing member may be moved in an interlocking manner with a tilting operation of the cover so as to open or close the sheet passing opening.

Due to such a constitution, the sheet passing opening can be opened or closed in an interlocking manner with the tilting operation of the cover. For example, when a user pulls up the cover and brings the cover into an open state, the static-document pressing member is moved together with the cover so as to bring the sheet passing opening into an open state. On the other hand, when the user presses down the cover and brings the cover into a closed state, the static-document pressing member is moved together with the cover so as to bring the sheet passing opening into a closed state. In this manner, the user can bring the sheet passing opening into an opened state or a closed state by merely performing the tilting operation of the cover, that is, the pull-up operation or the press-down operation.

Then, by feeding the document using the automatic document feeding unit when the sheet passing opening assumes the open state, the image reader can read the document and hence, the easy-to-use property of the image reader can be enhanced.

Further, the image reader may include a cover which incorporates an automatic document feeding unit, the static-document pressing member and the moving-document pressing member therein, is tiltably connected with a body portion (10a) in which the document reading plate is arranged, and covers the document reading plate, and a drive part which moves the static-document pressing member in the direction parallel to the cover, and the drive part opens or closes the sheet passing opening by moving the static-document pressing member.

Due to such a constitution, it is possible to open or close the sheet passing opening by moving the static-document pressing member using the drive part.

Accordingly, at the time of feeding the document using the automatic document feeding unit, the drive part is operated so as to move the static-document pressing member in the direction parallel to the cover thus bringing the sheet passing opening into an open state. On the other hand, in performing the static-document reading, the drive part is operated so as to move the static-document pressing member in the direction parallel to the cover thus bringing the sheet passing opening into a closed state. Due to such an operation, at the time of reading the document, it is no more necessary for a user to perform an operation to pull up the cover for moving the static-document pressing member thus enhancing the easy-to-use property of the image reader.

Further, the drive part may be constituted of a roller and a motor or the like which rotates the roller, and the drive part may be configured to be operated when a reading start switch for starting image reading is manipulated. Due to such a constitution, at the time of performing the moving-document reading, it is possible to bring the sheet passing opening into an open state with the mere operation of the reading starting switch by the user (for example, the pushing down of the reading starting switch by the user). Accordingly, with the simple operation to manipulate the reading start switch, it is possible to perform the moving-document reading and hence, it is possible to provide the extremely easy-to-use image reader.

Here, the mere movement of the static-document pressing member in the direction parallel to the cover makes an end portion of the moved cover project to the outside of an outer periphery of the cover. Accordingly, it is necessary to increase an occupying space which the image reader occupies by an amount corresponding to the projection of the cover.

Accordingly, according to a fourth aspect of the present invention, at least a portion of the static-document pressing member which projects to the outside of an outer periphery of the cover when the static-document pressing member is moved in the direction parallel to the cover by the drive part may possess the resiliency and, to prevent the resilient portion of the static-document pressing member from projecting to the outside of the outer periphery of the cover, the image reader may include a turning guide mechanism which turns the resilient portion of the static-document pressing member to the inside of the outer periphery of the cover based on a predetermined angle condition.

Here, "predetermined angle condition" is a condition which is relevant to an angle which is determined based on a position at which the static-document pressing member is turned and a position of the outer periphery of the cover to prevent the static-document pressing member having resiliency from projecting to the outside of the outer periphery of the cover. For example, when the position at which the static-document pressing member is turned is close to the outer periphery of the cover, the angle which turns the static-document pressing member becomes approximately 90° or more and 180° or less, while when the position at which the static-document pressing member is turned is away toward the inside from the outer periphery of the cover, the angle at which the static-document pressing member is turned may be set smaller than 90°.

Further, "portion of the static-document pressing member which projects to the outside of the outer periphery of the cover when the static-document pressing member is moved in the direction parallel to the cover by the drive part" implies a portion of the static-document pressing member which projects to the outside of the outer periphery of the cover when the static-document pressing member is moved in the direction parallel to the cover in a state that the turning guide mechanism is not present.

Due to such a constitution, when the static-document pressing member is moved in the direction parallel to the cover, the static-document pressing member is turned and guided toward the inside of the outer periphery of the cover (10b) by the turning guide mechanism. Accordingly, there is no possibility that the static-document pressing member projects to the outside of the outer periphery of the cover when the static-document pressing member (15) is moved, and hence, it is possible to reduce a space which the image reader occupies.

Here, "resilient portion" implies that a portion of or the whole static-document pressing member (15) may be formed of a material having resiliency or may be formed of a plurality of parts which imparts the deflection to the static-document pressing member (15).

Further, as a method which moves the static-document pressing member using the open/close means, the image reader may include a cover which incorporates an automatic document feeding unit, the static-document pressing member and the moving-document pressing member therein, is tiltably connected with a body portion in which the document reading plate is arranged and covers the document reading plate, the static-document pressing member includes a handle, and the sheet passing opening may be opened or closed by moving the static-document pressing member in the direction parallel to the cover by way of the handle.

Due to such a constitution, it is possible to easily constitute a mechanism for moving the static-document pressing member. For example, a guide groove is formed in the cover in the direction parallel to the cover, and the static-document pressing member may be moved in the direction parallel to the cover by the guide groove. In this manner, the mechanism for moving the static-document pressing member can be easily constituted and hence, it is possible to realize the reduction of weight and the reduction of cost of the image reader.

What is claimed is:

1. An image reader comprising:
   a reading unit for reading an image formed on a document;
   a document reading plate on which the document is placed;
   an automatic document feeding unit having a sheet passing opening which allows the document to pass therethrough at a position which faces the document reading plate, the automatic document feeding unit configured to automatically feed the document to a document reading position which is set on the document reading plate;
   a first document pressing member which is movably arranged so as to open or close the sheet passing opening at a position which faces the document reading plate, the first document pressing member configured press the document placed in a still state to the document reading plate side at the time of reading the static document; and
   a second document pressing member configured to press the document which is automatically fed by the automatic document feeding unit at the document reading position when the first document pressing member is moved so as to open the sheet passing opening.

2. An image reader according to claim 1, wherein a sheet feeding opening and a sheet discharging opening are formed at both sides of the second document pressing member and the sheet passing opening is formed of either one of the sheet feeding opening and the sheet discharging opening.

3. An image reader according to claim 1, wherein the sheet feeding opening is formed on the first document pressing member side.

4. An image reader according to claim 1, further comprising a cover in which the automatic document feeding unit, the first document pressing member and the second document pressing member are mounted, the cover being tiltably connected with a main body in which the document reading plate is disposed, the cover covering the document reading plate,
   wherein the first document pressing member is moved in an interlocking manner with a tilting operation of the cover so as to open or close the sheet passing opening.

5. An image reader according to claim 1, further comprising:
a cover in which the automatic document feeding unit, the first document pressing member and the second document pressing member are mounted, the cover being tiltably connected with a main body in which the document reading plate is disposed, the cover covering the document reading plate; and
a drive part configured to move the first document pressing member in a direction parallel to the cover, wherein the drive part opens or closes the sheet passing opening by moving the first document pressing member.

6. An image reader according to claim 5, wherein at least a portion of the first document pressing member which projects to the outside of the outer periphery of the cover when the first document pressing member is moved in the direction parallel to the cover by the drive part includes resiliency and, to prevent the resilient portion of the first document pressing member from projecting to the outside of the outer periphery of the cover, the image reader includes a turning guide mechanism which turns the resilient portion of the first document pressing member to the inside of the outer periphery of the cover based on a predetermined angle condition.

7. An image reader according to claim 1, further comprising a cover in which the automatic document feeding unit, the first document pressing member and the second document pressing member therein are mounted, the cover being tiltably connected with a main body in which the document reading plate is disposed, the cover covering the document reading plate,
wherein the first document pressing member includes a handle, and the sheet passing opening is opened or closed by moving the first document pressing member in the direction parallel to the cover by way of the handle.

8. An image reader comprising:
a reading means for reading an image formed on a document;
a document reading plate on which the document is placed;
an automatic document feeding means which has a sheet passing opening which allows the document to pass therethrough at a position which faces the document reading plate, the automatic document feeding means configured to automatically feed the document to a document reading position which is set on the document reading plate;
a first document pressing member which is movably arranged so as to open or close the sheet passing opening at a position which faces the document reading plate, the first document pressing member configured press the document placed in a still state to the document reading plate side at the time of reading the static document; and
a second document pressing member configured to press the document which is automatically fed by the automatic document feeding means at the document reading position when the first document pressing member is moved so as to open the sheet passing opening.

9. An image reader according to claim 8, wherein a sheet feeding opening and a sheet discharging opening are formed at both sides of the second document pressing member and the sheet passing opening is formed of either one of the sheet feeding opening and the sheet discharging opening.

10. An image reader according to claim 9, wherein the sheet feeding opening is formed on the first document pressing member side.

11. An image reader according to claim 8, further comprising a cover in which the automatic document feeding means, the first document pressing member and the second document pressing member are mounted, the cover being tiltably connected with a main body in which the document reading plate is disposed, the cover covering the document reading plate,
wherein the first document pressing member is moved in an interlocking manner with a tilting operation of the cover so as to open or close the sheet passing opening.

12. An image reader according to claim 8, further comprising:
a cover in which the automatic document feeding means, the first document pressing member and the second document pressing member are mounted, the cover being tiltably connected with a main body in which the document reading plate is disposed, the cover covering the document reading plate;
a drive part configured to move the first document pressing member in a direction parallel to the cover, wherein the drive part opens or closes the sheet passing opening by moving the first document pressing member.

13. An image reader according to claim 12, wherein at least a portion of the first document pressing member which projects to the outside of the outer periphery of the cover when the first document pressing member is moved in the direction parallel to the cover by the drive part includes resiliency and, to prevent the resilient portion of the first document pressing member from projecting to the outside of the outer periphery of the cover, the image reader includes a turning guide mechanism which turns the resilient portion of the first document pressing member to the inside of the outer periphery of the cover based on a predetermined angle condition.

14. An image reader according to claim 8, further comprising a cover in which the automatic document feeding means, the first document pressing member and the second document pressing member are mounted, the cover being tiltably connected with a main body in which the document reading plate is disposed, the cover covering the document reading plate,
wherein the first document pressing member includes a handle, and the sheet passing opening is opened or closed by moving the first document pressing member in the direction parallel to the cover by way of the handle.

15. An image reading method using a static-document reading function and a moving-document reading function of an image reader, the image reading method comprising the steps of:
reading an image formed on a document;
placing a document on a document reading plate;
automatically feeding a document to a document reading position which is set on the document reading plate by passing the document through a sheet passing opening at a position which faces the document reading plate;
pressing the static document to the document reading plate side at the time of reading the static document by the first document pressing member by moving a first document pressing member so as to open or close the sheet passing opening at a position which faces the document reading plate and; and
pressing the document which is automatically fed by the automatic document feeding means by a second document pressing member at the document reading position when the first document pressing member is moved so as to open the sheet passing opening.

16. An image reading method according to claim 15, wherein the sheet passing opening is formed of a sheet feeding opening and a sheet discharging opening which are formed at both sides of the second document pressing member, and the sheet feeding opening is closed or opened by the first document pressing member.

* * * * *